US007882290B2

(12) United States Patent
Lin

(10) Patent No.: US 7,882,290 B2
(45) Date of Patent: Feb. 1, 2011

(54) METHOD FOR PREVENTING TRANSACTION COLLISION ON BUS AND COMPUTER SYSTEM UTILIZING THE SAME

(75) Inventor: Hao-Lin Lin, Taipei (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 110 days.

(21) Appl. No.: 12/402,635

(22) Filed: Mar. 12, 2009

(65) Prior Publication Data

US 2010/0153601 A1     Jun. 17, 2010

(30) Foreign Application Priority Data

Dec. 12, 2008 (TW) .............................. 97148485 A

(51) Int. Cl.
*G06F 13/00* (2006.01)
*G06F 13/372* (2006.01)

(52) U.S. Cl. ..................... 710/110; 710/117; 710/124

(58) Field of Classification Search .................. 710/110
See application file for complete search history.

(56) References Cited

U.S. PATENT DOCUMENTS

| | | | | |
|---|---|---|---|---|
| 6,092,138 | A * | 7/2000 | Schutte ........................ | 710/113 |
| 6,530,029 | B1 * | 3/2003 | Metchev ....................... | 713/500 |
| 6,654,833 | B1 * | 11/2003 | LaBerge ....................... | 710/107 |
| 6,851,001 | B1 * | 2/2005 | Oudet ........................... | 710/104 |
| 7,039,734 | B2 * | 5/2006 | Sun et al. ..................... | 710/110 |
| 7,281,070 | B2 * | 10/2007 | Bomhoff et al. ............. | 710/110 |
| 7,366,809 | B2 * | 4/2008 | Saripalli et al. ............. | 710/110 |
| 2003/0105910 | A1 * | 6/2003 | Noonan et al. ............... | 710/306 |
| 2003/0208650 | A1 * | 11/2003 | Depew et al. ................ | 710/302 |
| 2004/0010728 | A1 * | 1/2004 | Musumeci et al. .......... | 713/400 |
| 2004/0073733 | A1 * | 4/2004 | LaBerge ....................... | 710/117 |
| 2004/0123007 | A1 * | 6/2004 | Stevens et al. ............... | 710/260 |
| 2005/0091427 | A1 * | 4/2005 | Yoshida et al. ............... | 710/48 |
| 2005/0228915 | A1 * | 10/2005 | Saripalli et al. ............. | 710/110 |

(Continued)

FOREIGN PATENT DOCUMENTS

CN     1740998 A     3/2006

OTHER PUBLICATIONS

Philips Semiconductors; "The I 2C-BUS Specification"; Philips Semiconductors; Revision 2.1; Jan. 2000; all pages.*

(Continued)

*Primary Examiner*—Ryan M Stiglic
(74) *Attorney, Agent, or Firm*—Thomas, Kayden, Horstemeyer & Risley

(57) ABSTRACT

A computer system is provided. The computer system includes a bus, a first master device, a second master device and a processor. The bus has a data line and a clock line. The first master device is coupled to the bus, detects a start phase of a first transaction on the data line, issues an interrupt message upon the detection of the start phase, and triggers a second transaction in response to a transaction indication message. The processor is coupled to the first master device, receives the interrupt message, and transmits the transaction indication message after a predetermined time interval upon reception of the interrupt message. The second master device is coupled to the bus and triggers the first transaction. The first transaction is finished within the predetermined time interval.

20 Claims, 6 Drawing Sheets

U.S. PATENT DOCUMENTS

| | | | |
|---|---|---|---|
| 2005/0228917 A1* | 10/2005 | Brink et al. | 710/200 |
| 2006/0104396 A1* | 5/2006 | Soriano et al. | 375/362 |
| 2006/0174044 A1* | 8/2006 | Bomhoff et al. | 710/110 |
| 2007/0140238 A1* | 6/2007 | Ewing et al. | 370/389 |
| 2007/0240011 A1* | 10/2007 | Saripalli et al. | 713/500 |

OTHER PUBLICATIONS

English abstract of CN1740998, pub. Mar. 1, 2006.

\* cited by examiner

METHOD FOR PREVENTING TRANSACTION COLLISION ON BUS AND COMPUTER SYSTEM UTILIZING THE SAME

CROSS REFERENCE TO RELATED APPLICATIONS

This Application claims priority of Taiwan Patent Application No. 97148485, filed on Dec. 12, 2008, the entirety of which is incorporated by reference herein.

BACKGROUND OF THE INVENTION

1. Field of the Invention

The invention relates to a data transaction mechanism that prevents transaction collisions on a bus, and more particularly to a data transaction mechanism that prevents transaction collisions on a System Management Bus (SM Bus) and/or an Inter-Integrated Circuit ($I^2C$) bus.

2. Description of the Related Art

A System Management Bus (SM Bus) and an Inter-Integrated Circuit ($I^2C$) bus are interfaces to connect important devices within a system. The SM Bus and the $I^2C$ bus have two bidirectional lines used for communication between devices, which includes a serial data line for transferring a data signal, and a serial clock line for transferring a clock signal. Although the SM Bus and the $I^2C$ bus are defined by different specifications, they follow the same transmission protocol. Generally, when there is no data to be transferred, signals on both the data and clock lines of the SM Bus and the $I^2C$ bus are kept at a high level. When transaction occurs, a high-to-low level or low-to-high level transition on the data line is only allowed when the clock signal is at high level.

For a multiple-master supported system, because any device, regardless of whether it's a master or slave device, that has to transfer data via the SM Bus and the $I^2C$ bus needs to be connected to the SM Bus and the $I^2C$ bus, a transaction by multiple master devices being connected to the same bus may be triggered. Specifically, when there is more than one master device issuing a message to trigger a transaction at about the same time, collision occurs, since master devices are unable to detect transaction requirements of other devices. As such, detection of transaction collision by the SM Bus and the $I^2C$ bus has been developed.

FIG. 1 shows the waveforms of the signals on the data line and clock line of an SM bus and on the data lines of two master devices that are connected to the SM bus. As shown in FIG. 1, DATA 1 represents the data line of a first master device, DATA 2 represents the data line of a second master device, SDA represents the data line of the SM bus, and the SCL represents the clock line of the SM bus. According to the mechanism defined by the specification of SM bus, one master device may determine whether it wins the arbitration of the SM bus according to the signal level on the data line. When the clock signal is at a high level and the data signal of the master device is at a low level, the master device determines that it wins the arbitration of the SM bus. As shown in FIG. 1, the first master device and the second master device continuously monitors the signal levels on the data lines during the first clock period CK1, the second clock period CK2, the third clock period CK3, . . . etc. In the example, the first master clock finally observes that it has lost the arbitration at the third clock CK3 since the signal level of the data line is different than what was expected (as shown in the figure, the clock signal is at a high level and the data signal of the master device is at a high level).

However, for such arbitration mechanisms, data error occurs when the master device is not capable of dealing with the transaction collision. As shown in FIG. 1, during the third clock period CK3, since the data signal of the second master device is at a low level when the clock is at a high level, the second master device wins the arbitration. Specifically, since data signal of the first master device is at a high level when the clock is at a high level, the first master device loses the arbitration. However, the high level on the data line DATA 1 after the third clock CK3 may refer to a valid data transfer, instead of a stop phase of a data transaction. That is, when the second master wins the arbitration, the data transaction of the first master device may have not yet been finished. Once the first master device can not handle the transaction collision, data error may occur at the first master device, which may further cause serious system problems.

Thus, a novel data transaction mechanism that prevents transaction collisions on the SM bus or the $I^2C$ bus is highly required.

BRIEF SUMMARY OF THE INVENTION

A computer system and method for preventing transaction collision on a bus are provided. An exemplary embodiment of the method comprises: detecting a start phase of a first transaction on a bus via a detection pin of a first master device, wherein the first transaction is triggered by a second master device coupled to the bus; waiting for a predetermined time interval when the start phase of the first transaction is detected, wherein the first transaction is finished within the predetermined time interval; and triggering a second transaction of the first master device on the bus after the predetermined time interval.

An exemplary embodiment of a computer system comprises a bus, a first master device, a second master device and a processor. The bus comprises a data line and a clock line. The first master device is coupled to the bus, detects a start phase of a first transaction on the data line, issues an interrupt message upon the detection of the start phase, and triggers a second transaction in response to a transaction indication message. The processor is coupled to the first master device, receives the interrupt message, and transmits the transaction indication message after a predetermined time interval upon reception of the interrupt message. The second master device is coupled to the bus and triggers the first transaction. The first transaction is finished within the predetermined time interval.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
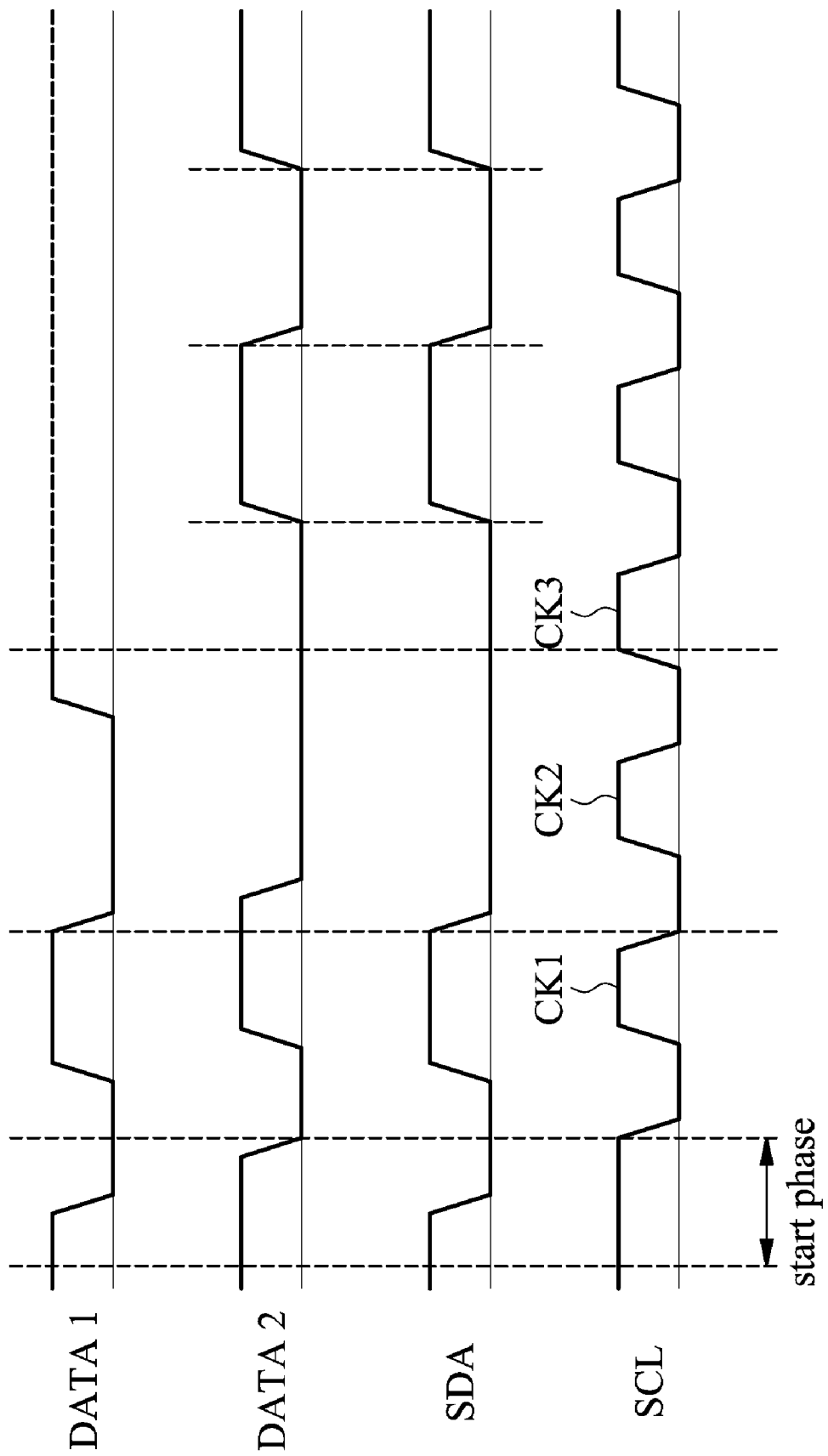
FIG. 1 shows the waveforms of the signals on the data line and clock line of an SM bus and on the data lines of two master devices that are connected to the SM bus.
Figure 2:
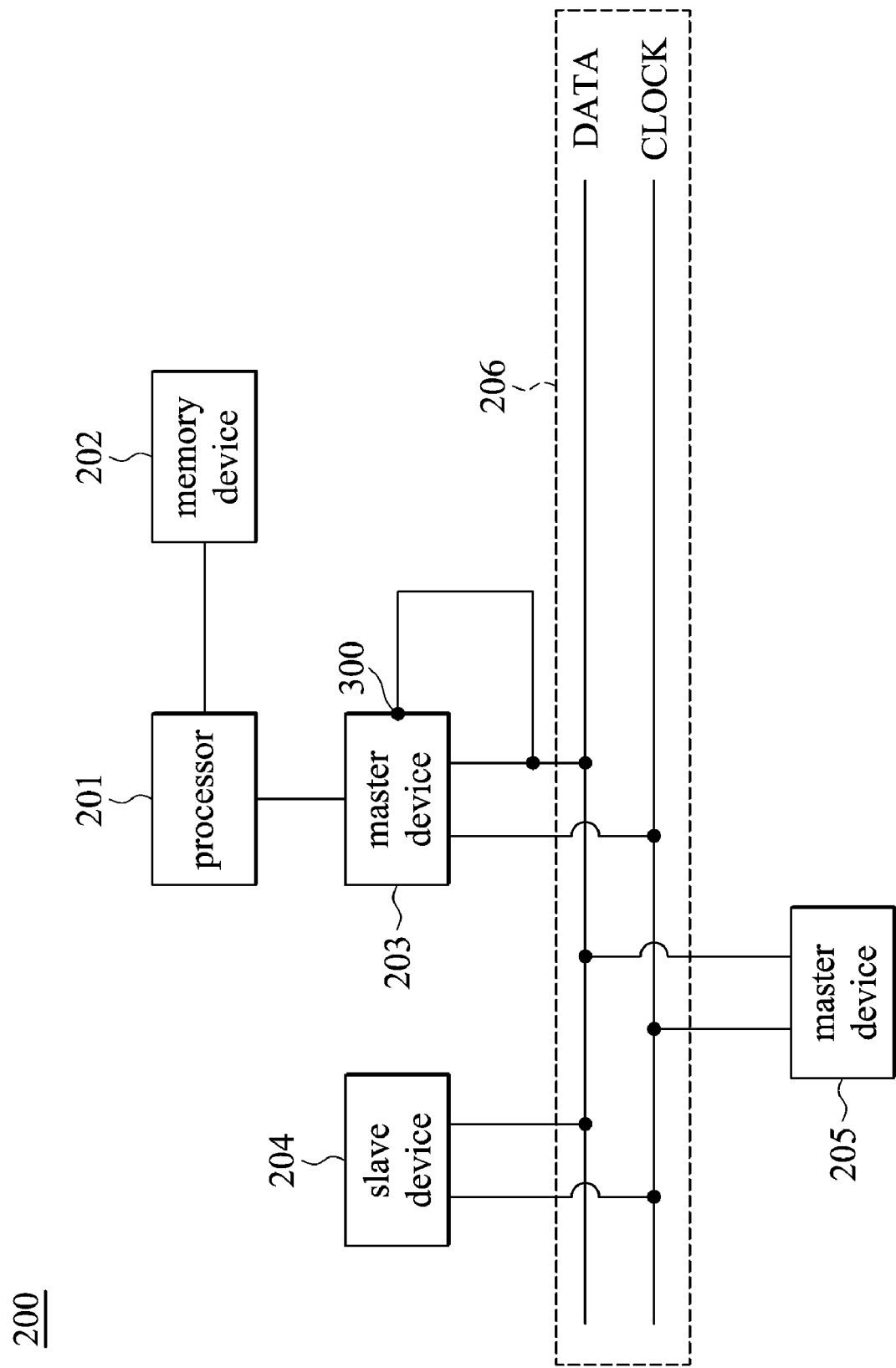
FIG. 2 shows a computer system according to an embodiment of the invention.

FIG. 2 shows a computer system according to an embodiment of the invention. The computer system 200 comprises a processor 201, a memory device 202, master devices 203 and 205, a slave device 204 and a bus 206. The bus 206 comprises a data line DATA and a clock line CLOCK. The master devices 203 and 205 and the slave device 204 are coupled to the bus 206. The processor 201 is coupled to the memory device 202 and the master device 203, executes a system program stored in the memory device 202, and issues some commands to control the master device 203, accordingly.

Figure 3:
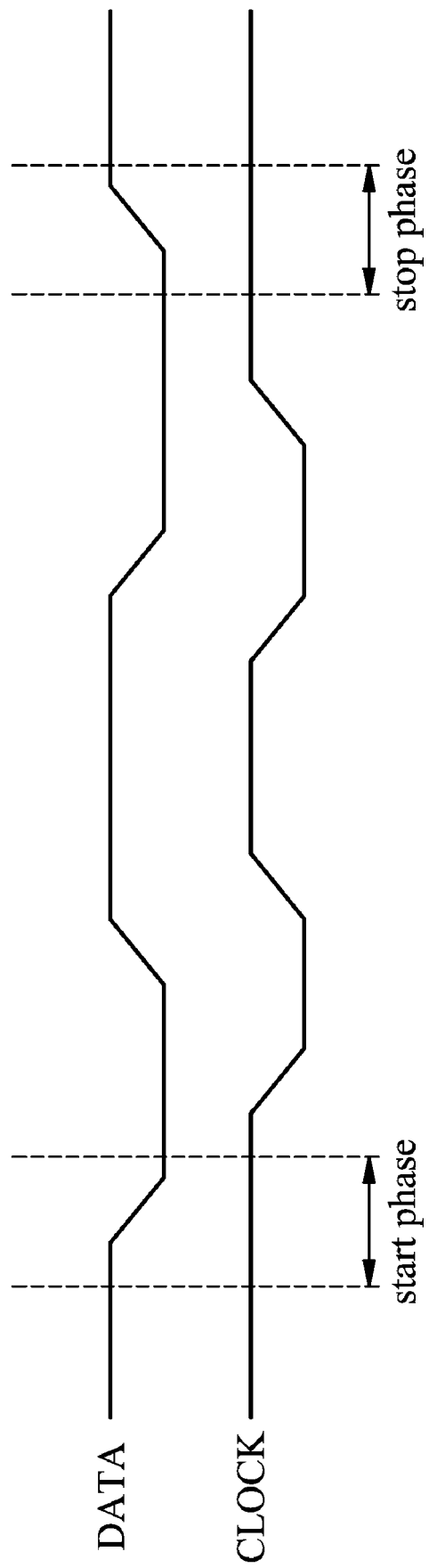
FIG. 3 shows exemplary waveforms of the data signal and clock signal on the data line and clock line of a bus during a transaction.

According to an embodiment of the invention, the bus 206 may be one of the SM Bus (System Management Bus) and the I²C (Inter-Integrated Circuit) bus. FIG. 3 shows exemplary waveforms of the data signal and clock signal on the data line and clock line of a bus during a transaction. As shown in FIG. 3, when there is no transaction on the bus, the clock signal on the clock line CLOCK and the data signal on the data line DATA are kept at high level. When a master device coupled to the bus needs to trigger a transaction, the master device issues a data signal of low level onto the data line DATA so as to pull down the signal level on the data line DATA when the clock signal on the clock line is at high level. A falling edge representing a high level to low level transition of the data on the data line DATA is thus generated so as to control the bus to enter a start phase of the transaction, and the transaction begins. When the master device needs to terminate the transaction, the master device issues a data signal with a low level to high level transition to the data line DATA so as to pull up the signal level on the data line DATA when the clock signal on the clock line is at high level. A rising edge representing a low level to high level transition of the data on the data line is thus generated so as to control the bus to enter a stop phase of the transaction, and to finish the transaction.

According to the embodiment of the invention, the master device 203 as shown in FIG. 2 comprises an additional detection pin 300 coupled to the data line DATA to detect the start phase of the bus 206 as shown in FIG. 3. As an example, a falling edge with data signal on the data line DATA changed from high level to low level is detected. The start phase may be a start phase of a transaction triggered by the master device 205, or triggered by another master device that is coupled to the bus 206. When the detection pin 300 detects a start phase occurring on the bus 206, the other master device 203 issues an interrupt message to the processor 201. The processor 201 transmits a transaction indication message to the master device 203 after a predetermined time interval upon reception of the interrupt message, wherein the predetermined time interval is long enough for the master device to finish the current transaction on the bus 206. Next, the master device 203 triggers the other transaction on the bus 206 in response to the received transaction indication message. As an example, the transaction triggered by the master device 203 is to access data of a slave device 204 via the bus 206 and transfer the obtained data of the slave device 204 to the processor 201. The processor 201 stores the data of the slave device in the memory device 202. According to an embodiment of the invention, the system program stored in the memory device 202 comprises at least one application program. When the data of the slave device 204 is required while executing the application program, at least one slave device access request message would be generated to indicate to the processor 201 that the slave device 204 should be accessed. At this time, the processor 201 replies to the slave device access request message according to the data stored in the memory device in advance, so as to provide the data to the application program.

Figure 4:
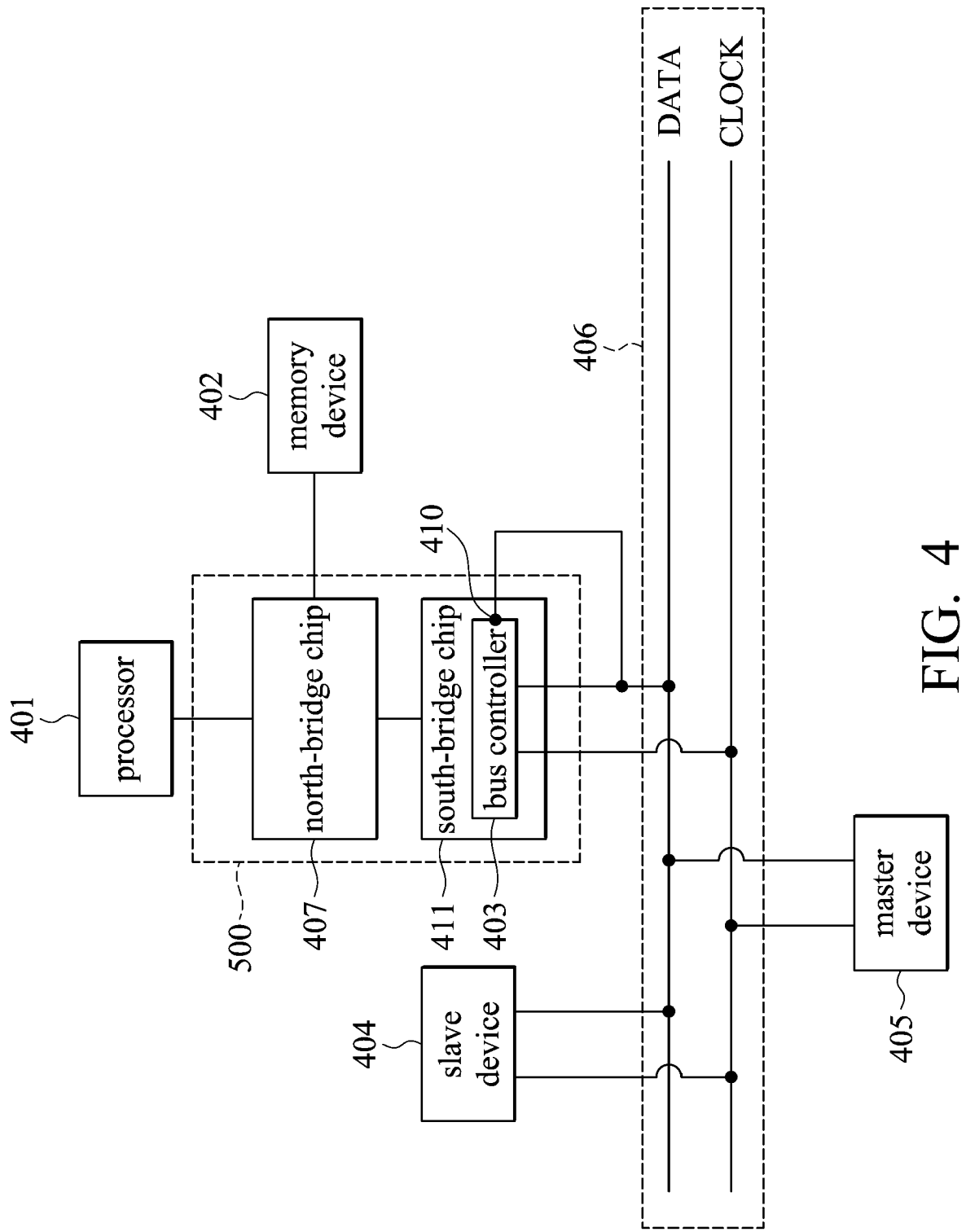
FIG. 4 shows a computer system according to another embodiment of the invention.

FIG. 4 shows a computer system according to another embodiment of the invention. Computer system 400 comprises a processor 401, a memory device 402, a north-bridge chip 407, a south-bridge chip 411, a bus controller 403, a master device 405, a slave device 404 and a bus 406. The bus comprises a data line DATA and a clock line CLOCK. The bus controller 403, master device 405 and slave device 404 are coupled to the bus 406. The bus controller 403 may be disposed in the south-bridge chip 411. The north-bridge chip 407 is coupled to the memory device 402, the south-bridge chip 411 and the processor 401, and performs as a bridge to receive and distribute the commands from the processor to the memory device 402 and the south-bridge chip 411. The processor 401 executes a system program stored in the memory device 402, and accordingly issues commands to control peripheral devices (for example, the south-bridge chip 411). According to an embodiment of the invention, the processor 401 may be a CPU (Central Processing Unit), the memory device 402 may be a DRAM (Dynamic Random Access Memory), the bus 406 may be an SM bus or an I²C bus, the bus controller 403 may be an SM bus controller or an I²C bus controller, and the slave device 404 may be a battery device. In addition, according to an embodiment of the invention, the bus controller 403 may be regarded as a master device of the computer system to trigger a transaction on the bus via software programs. For example, a transaction of the bus controller 403 is triggered by executing the software program to access data indicating a status of the slave device (for example, slave device 404) coupled to the bus 406. According to an embodiment of the invention, the master device 405 may be regarded as another master device coupled to the bus 406, such as a charger chip that has the ability to periodically trigger (on the contrary, not controlled by the software program) the transactions on the bus 406. Thus, the period of the predetermined time interval may be defined according to the time for the master device 405 to finish a transaction, wherein the transaction periodically accesses the data of status of the slave device (e.g. slave device 404) via the bus 406. In addition, according to an embodiment of the invention, the system program stored in the memory device 402 may be an OS (Operating System) program, and the north-bridge chip 407 and the south-bridge chip 411 may be further integrated as a chip set 500.

According to an embodiment of the invention, the bus controller 403 in the south-bridge chip 411 comprises an additional detection pin 410 coupled to the data line DATA to detect a start phase of a transaction on the bus 406 as shown in FIG. 3, wherein the start phase may be a start phase of a transaction triggered by the master device 405, or other master device coupled to the bus 406. When a start phase on the bus 406 is detected by the detection pin 410, the bus controller 403 issues an interrupt message (for example, an SCI (System Control Interrupt) message) to the north-bridge chip 407. The north-bridge chip 407 further transmits the interrupt message to the processor 401 (for example, the CPU). The system program (for example, an OS program) calls a corresponding ASL (ACPI Source Language) code of ACPI (Advanced Configuration and Power Interface, ACPI) program in response to the interrupt message. The ASL code may be programmed to wait for a predetermined time interval that is long enough for a transaction currently taken place on the bus 406 to be finished. The processor 401 transmits a transaction indication message to the bus controller 403 after the predetermined time interval upon reception of the interrupt message. Next, the bus controller 403 triggers a transaction on the bus 406 in response to the received transaction indication message. As an example, the transaction is to access the data of the slave device 404 via the bus 406. When the bus controller 403 obtains the data, the bus controller 403 further transmits the data to the processor 401. The processor 401 stores the received data in the memory device 402 (e.g. the DRAM).

According to an embodiment of the invention, the system program (e.g. the OS program) stored in the memory device 402 comprises at least one application program. When the application program executed by the processor 401 requires the data of the slave device, at least one slave device access request message would be generated to indicate the processor 401 to access the slave device 404. Meanwhile, the processor 401, instead of indicating the bus controller 403 to trigger a transaction on the bus 406, replies to the slave device access request message according to the data of the slave device stored in the memory device 402, so as to provide the data for the application program. The data of the slave device 404 is accessed in advance by the bus controller 403 on a free occasion and stored in the memory device 402.

In this manner, the collisions of the non-periodic transactions with the transactions triggered by other master devices on the bus are prevented. The unexpected errors due to the transaction collision are further avoided, so as to stabilize the computer system. In addition, for the master device 405 that does not trigger the transaction under the software control, possible transaction collisions are avoided since the transaction of the bus controller 403 is triggered on the free occasion after the transaction of the master device 405 is finished. Further, since the master device 405 triggers transactions automatically and periodically, the wait time (i.e. the predetermined time interval as previously described) of the bus controller 403 is predictable and can be determined according to the property of the master device 405. Thus, when a start phase of the transaction of the master device 405 is detected, the bus controller 403 issues the system control interrupt (SCI) and waits for the termination of the transaction. The transaction of the bus controller 403 is further triggered after the transaction of the master device 405 is finished so as to avoid transaction collision.

Figure 5:
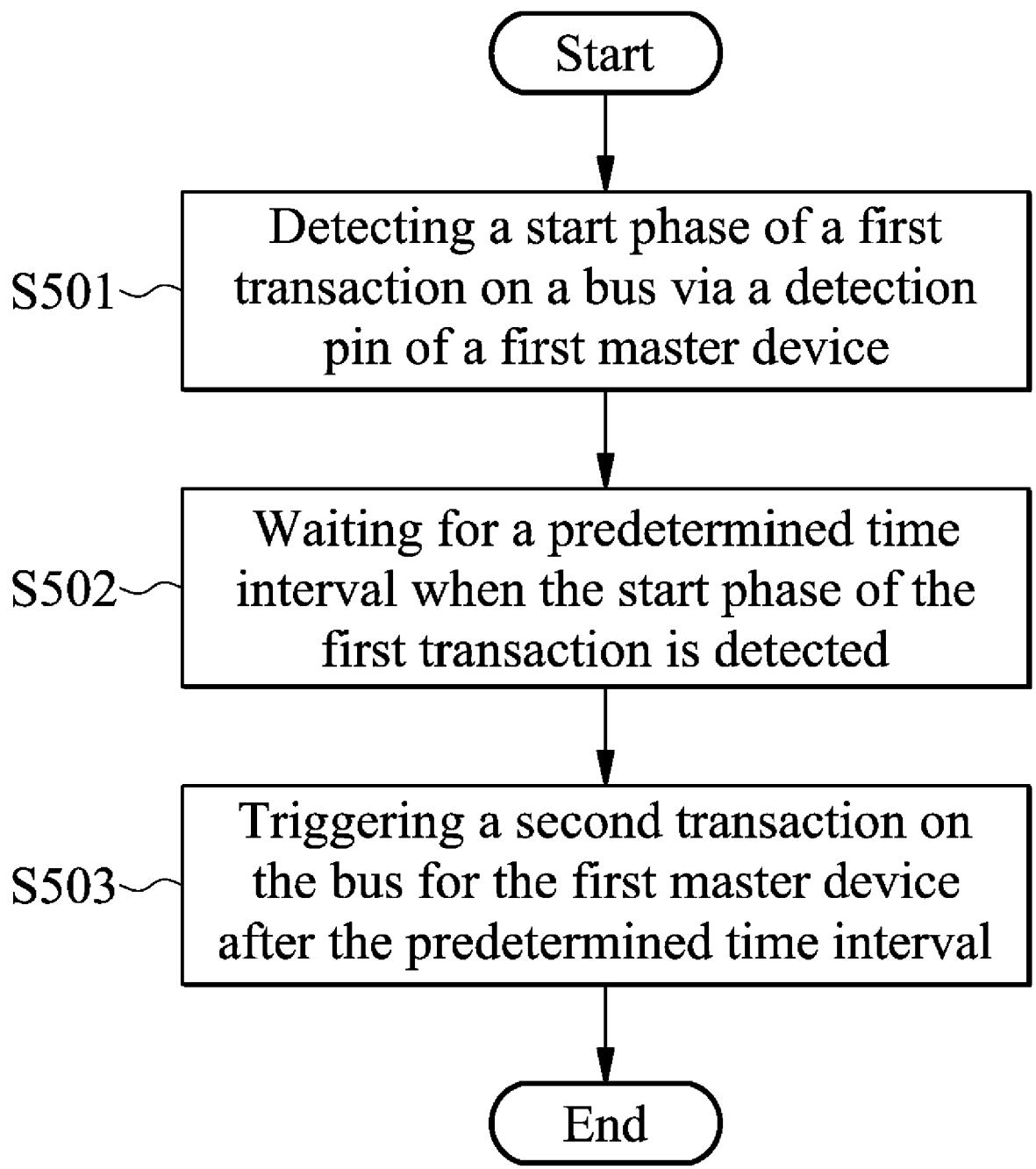
FIG. 5 shows a flow chart of a method for preventing transaction collision on a bus according to an embodiment of the invention.

FIG. 5 shows a flow chart of a method for preventing transaction collision on a bus according to an embodiment of the invention. Reference may be made to both FIG. 2 and FIG. 5. Firstly, a start phase of a first transaction on a bus 206 is detected via a detection pin 300 of a first master device 203, wherein the first transaction is triggered by another master device 205 coupled to the bus 206 (Step S501). Next, the first master device 203 waits for a predetermined time interval when the start phase of the first transaction is detected, wherein the first transaction is finished within the predetermined time interval (Step S502). That is, the predetermined time interval is long enough for the master device 205 to finish the first transaction. Finally, a second transaction on the bus for the first master device 203 is triggered after the predetermined time interval (Step S503). As an example, the second transaction of the master device 203 is to access the data of a slave device 204 via the bus, and to store the obtained data of the slave device 204 in the memory device 202. In response to the reception of a slave device access request message, the slave device access request message is replied to according to the data of the slave device stored in the memory device 202. Thus, the master device 203 does not need to trigger another transaction to access the data of the slave device 204 when receiving the slave device access request message.

Figure 6:
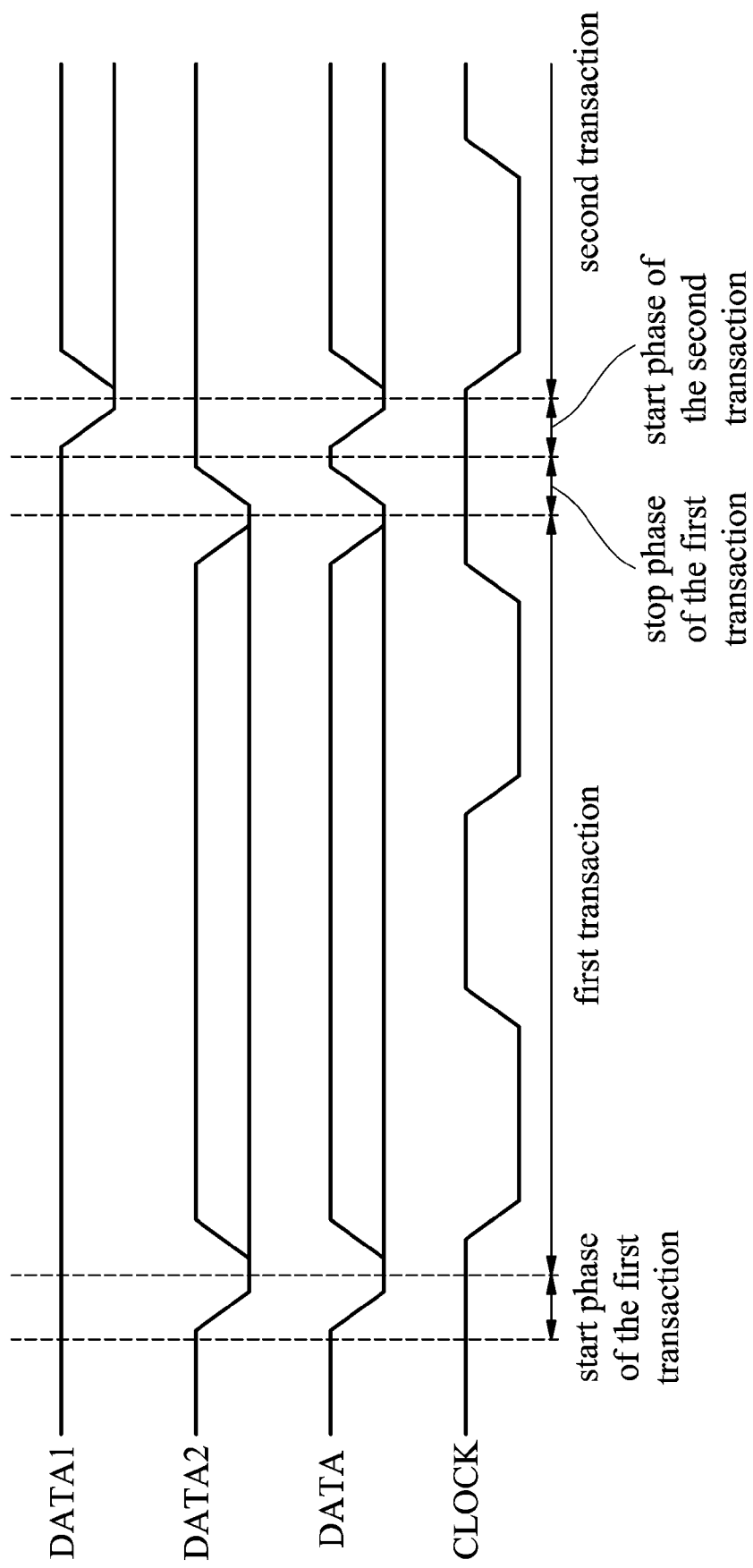
FIG. 6 shows exemplary waveforms of the data signal and clock signal on the data line and clock line of a bus and the data lines of a first and a second master device coupled to the bus according to an embodiment of the invention

FIG. 6 shows exemplary waveforms of the data signal and clock signal on the data line and clock line of a bus and the data lines of a first and a second master device coupled to the bus according to an embodiment of the invention. As shown in FIG. 6, DATA 1 represents the data line of the first master device (for example, the master device 203 as shown in FIG. 2), DATA 2 represents the data line of the second master device (for example, the master device 205 as shown in FIG. 2), DATA represents the data line of the bus, and CLOCK represents the clock line of the bus. According to the transaction collision preventing method as described, when the second master device needs to trigger a first transaction, a falling edge with a high level to low level transition of the data signal on the data line DATA 2 is generated so as to control the bus to enter a start phase of the first transaction, and the first transaction begins. When the start phase of the first transaction is detected, the first master device waits for a predetermined time interval. That is, during the first transaction of the second master device, the data signal on the data line DATA 1 is kept high level. When the second master device plans to terminate the first transaction, the second device generates a rising edge with a low level to high level transition of the data signal on the data line DATA 2 when the clock signal on the clock line CLOCK is at high level, so as to control the bus to enter a stop phase of the first transaction to terminate the first transaction. After the stop phase of the first transaction of the second device is ended, the first master device triggers a second transaction. The first master device generates a falling edge with a high level to low level transition of the data signal on the data line DATA 1 so as to control the bus to enter a start phase of the second transaction. As shown in FIG. 6, the signal levels on the data line DATA of the bus are identical to the signal levels on the data line DATA 2 of the second master device during the start phase, the transaction time and the stop phase of the first transaction, and the signal levels on the data line DATA of the bus are identical to the signal levels on the data line DATA 1 of the first master device during the start phase and the transaction time of the second transaction.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for preventing transaction collision on a bus, comprising:

detecting a start phase of a first transaction on a bus via a detection pin of a first master device, wherein the first transaction is triggered by a second master device coupled to the bus;

waiting for a predetermined time interval when the start phase of the first transaction is detected, wherein the first transaction is finished within the predetermined time interval; and triggering a second transaction of the first master device on the bus after the predetermined time interval without detecting a stop phase of the first transaction.

2. The method as claimed in claim 1, wherein the bus comprises a data line and a clock line, the first master device is coupled to the bus and the detection pin is coupled to the data line.

3. The method as claimed in claim 2, wherein when the second master device triggers the first transaction, the second master device issues a data signal of low level to the data line when a clock signal on the clock line is at high level, so as to control the bus to enter the start phase.

4. The method as claimed in claim 2, wherein within the predetermined time interval, the second master device issues a data signal that is transferred from low level to high level onto the data line when a clock signal on the clock line is at high level to control the bus so as to enter the stop phase and finish the first transaction.

5. The method as claimed in claim 1, wherein the bus is a system management bus (SM bus) or an inter-integrated circuit (I2C) bus.

6. The method as claimed in claim 1, wherein the second transaction is a transaction of the first master device to access data of a slave device via the bus, and wherein the method further comprises:
   storing the data of the slave device in a memory device; and
   in response to reception of at least one slave device access request message, replying to the slave device access request message according to the data of the slave device stored in the memory device.

7. The method as claimed in claim 6, wherein the memory device further stores a system program, and the system program comprises at least one application program to generate the slave device access request message.

8. The method as claimed in claim 1, wherein the first master device is disposed in a chip set.

9. The method as claimed in claim 1, wherein when the detection pin detects the start phase, an interrupt program is executed to wait for the predetermined time interval.

10. The method as claimed in claim 1, wherein the first transaction is periodically triggered by the second master device.

11. A computer system, comprising:
   a bus comprising a data line and a clock line;
   a first master device coupled to the bus, wherein the first master device detects a start phase of a first transaction on the data line, issues an interrupt message upon the detection of the start phase, and triggers a second transaction in response to a transaction indication message without detecting a stop phase of the first transaction;
   a processor coupled to the first master device, receiving the interrupt message, and transmitting the transaction indication message after a predetermined time interval upon reception of the interrupt message; and
   a second master device coupled to the bus and triggering the first transaction, wherein the first transaction is finished within the predetermined time interval.

12. The computer system as claimed in claim 11, wherein the second master device issues a data signal of low level to the data line when a clock signal on the clock line is at high level, so as to control the bus to enter the start phase.

13. The computer system as claimed in claim 11, wherein within the predetermined time interval, the second master device issues a data signal that is transferred from low level to high level onto the data line when a clock signal on the clock line is at high level so as to control the bus to enter the stop phase and finish the first transaction.

14. The computer system as claimed in claim 11, wherein the bus is a system management bus (SM bus) or an inter-integrated circuit (I2C) bus.

15. The computer system as claimed in claim 11, further comprising:
   a slave device coupled to the bus; and
   a memory device coupled to the processor, wherein the second transaction is to access the data of the slave device via the bus and to transmit and store the data of the slave device in the memory device.

16. The computer system as claimed in claim 15, wherein the processor further receives at least one slave device access request message, and wherein the processor replies to the slave device access request message according to the data of the slave device stored in the memory device.

17. The computer system as claimed in claim 16, wherein the processor executes a system program, and wherein the system program comprises at least one application program to generate the slave device access request message.

18. The computer system as claimed in claim 11, wherein the first master device is disposed in a chip set.

19. The computer system as claimed in claim 11, wherein the first transaction is periodically triggered by the second master device.

20. The computer system as claimed in claim 11, wherein the first master device further comprises a detection pin coupled to the data line to detect the start phase.

* * * * *